July 29, 1941.   O. OGRODOWY   2,251,158
TRANSFER AND ORIENTING MECHANISM
Filed July 20, 1939   2 Sheets—Sheet 1
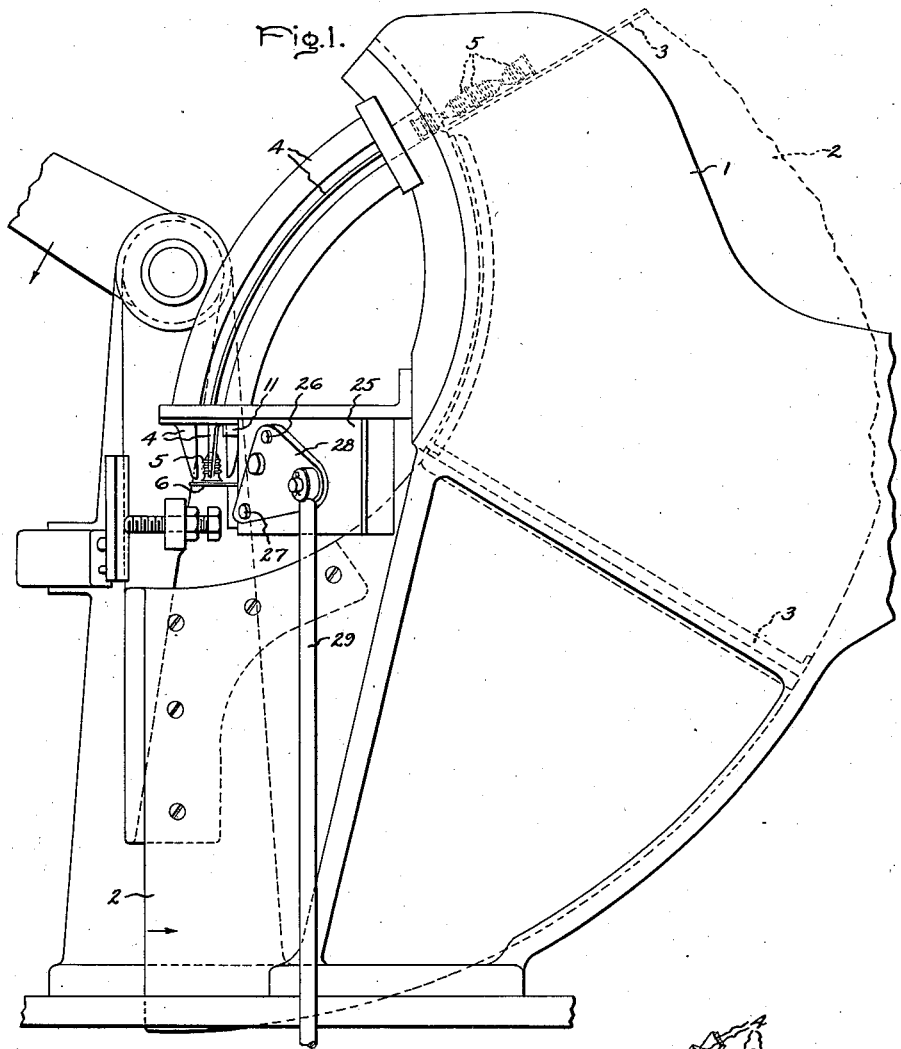
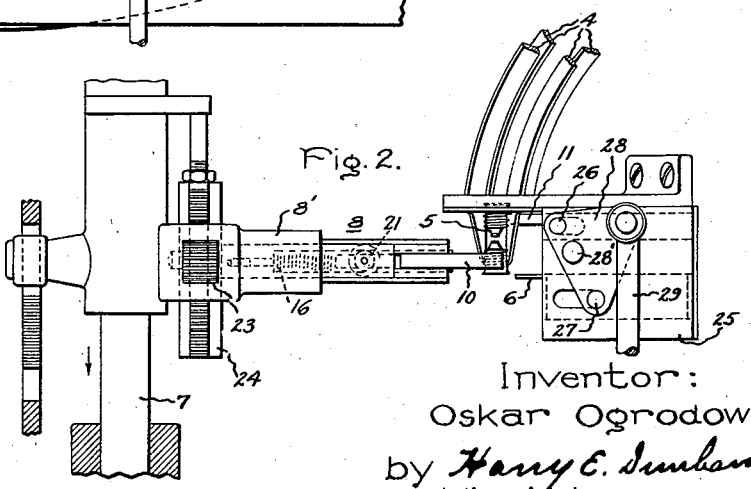
Inventor:
Oskar Ogrodowy,
by Harry E. Dunham
His Attorney.

July 29, 1941. O. OGRODOWY 2,251,158
TRANSFER AND ORIENTING MECHANISM
Filed July 20, 1939 2 Sheets-Sheet 2
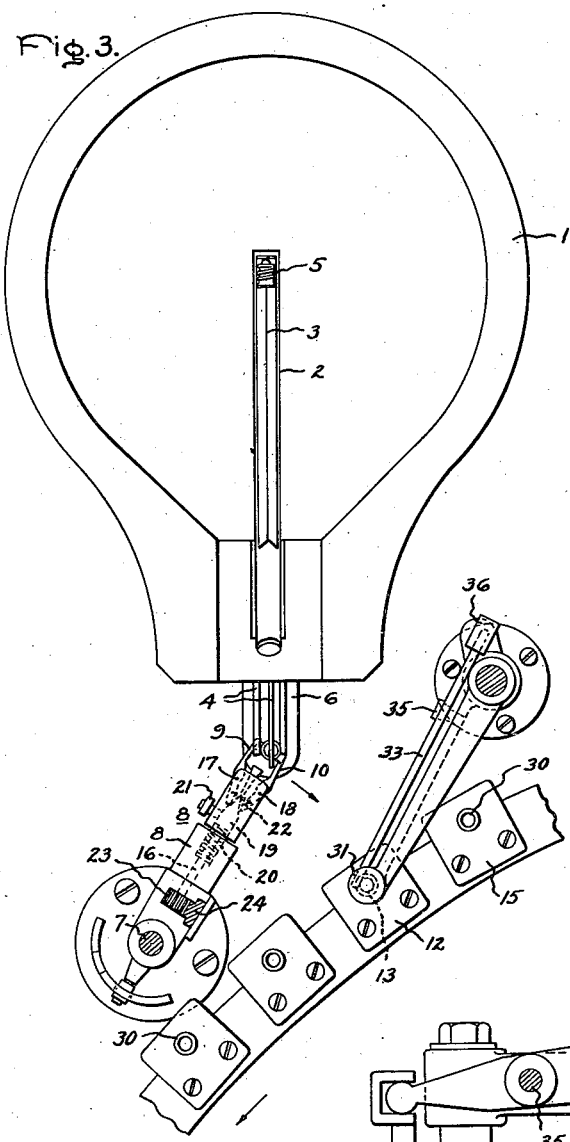
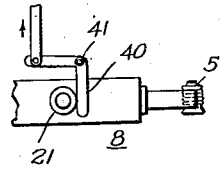
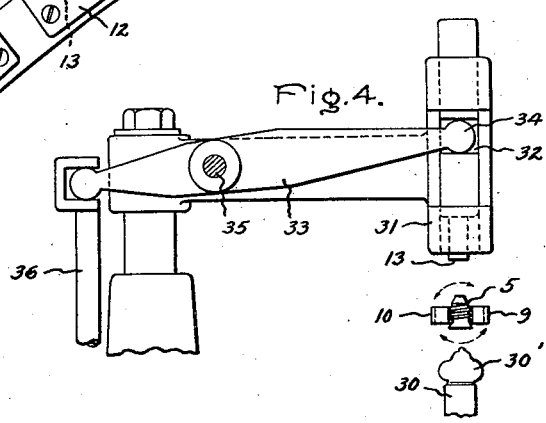
Inventor:
Oskar Ogrodowy.
by Harry E. Dunham
His Attorney.

Patented July 29, 1941

2,251,158

UNITED STATES PATENT OFFICE 2,251,158

TRANSFER AND ORIENTING MECHANISM

Oskar Ogrodowy, Biesdorf-Nord, Germany, assignor to General Electric Company, a corporation of New York Application July 20, 1939, Serial No. 285,624
In Germany August 27, 1938

6 Claims. (Cl. 214—1)

My invention relates to transfer or feeding apparatus for hollow cylindrical bodies which are closed at one end, such as bases for electric incandescent or discharge lamps or similar devices.

It is comparatively simple to bring cylindrical hollow bodies or shells which are open on one side, such as the bases of incandescent lamps, from a container or hopper in which these bases lie in a haphazard fashion, to a trough or to a channel, in such a way that they are straightened out. This may be accomplished, for instance, by an oscillating knife-like device or segment whose upper edge has a groove therein. This segment is made to dip in the hopper and when it rises, the said shells or bases remain straightened out in the said groove. The hollow shells or bases have the same axial alignment, but they face in different directions, that is to say, their openings may face in one or the other direction. In order to straighten out all the shells so that they all have the same direction, sorting machines have been proposed in which the shells are pushed upward in a groove or in a channel and are allowed to fall through a hole in the trough, said hole having a diameter corresponding to that of the shells. The said shells fall with their opening facing upward, since the center of gravity is located adjacent the bottom or closed end of the shell. Devices have also been proposed in which the shells slide downward in a vertical channel, in which case, the shells whose bottom faces upward are grasped by an arm which swings into the trough, in such a way that the shells are turned; owing to the lateral position of their center of gravity, the shells whose bottom is already facing downward are not turned by the arm.

In machines which are to produce electric incandescent or gas-discharge lamps, it is frequently required that the shells or bases should be brought automatically with their bottom upward, to a certain operating or processing station in the machine. In this case, one cannot make use of the fact, for straightening the bases, that the center of gravity, longitudinally speaking, has a one-sided position. In order to be able to straighten out the bases automatically, even in such a case, the device comprising my invention is used in supplying bases to machines for producing electric incandescent or gas-discharge tubes in which transfer mechanism including a pair of jaws removes the bases individually from a channel in which they lie coaxially but with bottoms in any direction, and transfers the bases to a processing station. In this device, and according to the invention, a ram is positioned above the processing station, and its stroke between the jaws of the transfer mechanism is so limited that when the bottom or closed end of the base faces said ram, it will push the base out of the jaws, but when the base has the opposite position, the ram will leave the base untouched. Thereupon, the jaws turn 180 degrees around their longitudinal axis and the ram goes down for a second time and pushes the base out of the jaws if the base did not have its correct position at the first stroke. Instead of the second downward stroke of the ram, the jaws may be opened since, if the base is still present therein, it will be in its correct position. The transfer mechanism then moves again toward the supplying channel, whence the jaws take up a new base or shell. Further features and advantages of my invention will appear from the following detailed description of species thereof and from the drawings.

In the drawings, Fig. 1 is an elevation of the base or shell container or hopper, with the knife or segment which leads the bases toward the channel so that they are aligned parallel with respect to each other, but with their bottoms in any direction; Fig. 2 is an elevation of the base supply end of the channel and the transfer mechanism which transfers the bases to the processing station of the machine; Fig. 3 is a plan view showing the hopper, the transfer mechanism, a portion of the base-processing machine and the ram which removes the bases or shells from the transfer mechanism; Fig. 4 is an elevation of the ram; and Fig. 5 is a side view showing a modified mechanism for releasing the bases from the transfer mechanism.

Referring to the drawings, the supplying device consists of the hopper 1, in which the bases or shells lie in a haphazard fashion. A knife or segment 2 with a groove 3 at its upper edge dips in the hopper 1 so that the bases 5 will lie on the groove 3 in axial alignment, but with their bottoms facing any direction. From the groove 3 of segment 2, the bases 5 slide into a channel or chute 4, which consists of a pipe or, as in the present case, of several radially disposed bars. Through this channel, the bases 5 slide until they reach its lower end, where they are stopped by a plate 6. On the machine, transfer mechanism 8 is supported on a vertical shaft 7, in such a way that it can rotate and at the same time move a short distance up and down. The transfer mechanism is first in its lowest position, and is then brought with its jaws 9 and 10 below the channel 4, whereupon it moves upward by an amount equivalent to the length of a base and jaws 9 and 10 reach through the bars of channel 4. The said jaws, which were open until then, are now closed to grip a base 5. Within the sleeve 8' of the transfer mechanism is supported a shaft 16 on which the jaws 9 and 10 are pivotally mounted by means of pins 17 and 18. A wedge 19 is forced between the lever arms of jaws 9 and 10 through the effect of a spring 20, so that the jaws are kept normally closed. In order to open the jaws, said wedge 19 is pushed back by means of a lever (not shown) mounted on the machine, which lever presses against the roller 21 mounted on a stud extending from the wedge. Thereupon, the said jaws 9 and 10 open, due to the effect of a spring 22 which interconnects them. There is also provided a rack pinion 23 which meshes with a rack 24. When this rack 24 moves up or down, the shaft 16 is rotated on its axis 180 degrees.

After the jaws 9, 10 have grasped a base 5 at the lower end of the channel 4, they move downward again, by an amount equivalent to a cap length. To this end, the plate 6, which is guided in housing 25, slides laterally to permit removal of the lowest base. The other bases are prevented from following by means of a pusher or finger 11 which projects laterally into channel 41. This finger 11 is likewise supported on housing 25. The said finger 11, as well as the plate 6, each have a pin, 26 and 27 respectively, which is connected with a plate-like lever 28 that is likewise mounted on housing 25 and pivots about a pin 28'. This lever 28 is rotated by a pull rod 29 which is moved by a cam disk that is secured to the main shaft of the machine but that has not been shown in the drawings.

As soon as the plate 6 has closed the bottom of channel 4, the finger 11 is withdrawn, so that all bases 5 in the channel 4 will slide downward by one base length.

In the meanwhile, the jaws 9, 10, together with the base they are holding, have been swung in a horizontal plane about a shaft 7 to a delivery position above the processing station 12 (Fig. 3) of the machine. The said machine may, for instance, provide the bases with cement, and may fasten them to the lamp bulbs, or it may solder the leads or provide the bases with special inscriptions. Over the processing station 12, which may be provided with a pin 30 for supporting a bulb 30', a ram 13 is moved vertically within a sleeve 31. As soon as the transfer mechanism 8 has brought a base in its jaws 9, 10 over the processing station 12, the ram 13 moves downward by such an amount that it pushes the base, if the bottom or closed end of the latter faces upward, out of the jaws. In case the closed end of the base is lowermost, the ram enters the inside of the base where it meets no obstacle, so that it will leave the base untouched. The said ram 13 slides in the stationary sleeve 31, and is provided besides with an annular slot 32 which is engaged by a pin 34 which is mounted on the lever 33. This lever 33 is pivotally mounted in the stationary pin 35, and is actuated by a rod 36 which is connected to a cam disk mounted on the main shaft of the machine and not shown in the drawings.

After its first downward motion, the ram 13 moves up again, and then the jaws 9, 10 are rotated 180 degrees about their longitudinal axis through the pinion 23 and the rack 24. Thereupon, the lever 33 pushes the ram 13 downward a second time and by the same amount, so that the ram pushes the base 5 out of the jaws provided the base was not in the correct position (closed end up) at the first stroke. As soon as the ram 13 has returned to its original position, the jaws 9, 10 are swung back under the channel 4 and are opened again in order to receive a new base.

If desired, the jaws 9, 10 may be opened above the processing station 12 after their rotation of 180 degrees, so that the base will drop therefrom. This makes it possible to eliminate a second downward motion of the ram 13, since after the rotation of the jaws the base can have only its correct position; otherwise it would have been pushed out of the jaws by the ram prior to their rotation. Such opening of the jaws 9, 10 at station 12 may be accomplished by a lever 40 (Fig. 5) which is pivoted on pin 41 and engages the roller 21 to retract the wedge 19 from its position between the ends of the jaws 9, 10. While the jaws 9, 10 return to the channel 4 to receive a new base 5, the processing station 12 of the machine is shifted to another position, so that a new processing station 15 comes under the ram 13 and is provided with a base 5. The machine can be of the rotary type or it may carry the processing stations or a moving belt which travels rectilinearly.

What I claim as new and desire to secure by Letters Patent of the United States is:

1. Apparatus for transferring and delivering in a predetermined position cylindrical shells having one end closed, comprising a transfer mechanism including rotatable gripping means for engaging a shell at a supply position, means for feeding said shells to said supply position in a definite axial alignment but without regard to the direction in which their open ends face, means for transferring said gripping means to a delivery position, means for causing said gripping means to rotate at said delivery position to reverse the position of a shell therein, and means for causing said shell to be removed from said gripping means at said delivery position either prior to or after its rotation depending upon whether the closed end of said shell is facing in a predetermined direction.

2. Apparatus for transferring cylindrical shells having one end closed, comprising a transfer mechanism including gripping means for engaging a shell at its sides, a reciprocable ram means, means for transferring said gripping means to a position adjacent said ram means to carry the shell into axial alignment with said ram means, said ram means being arranged to move toward the said shell and having a stroke so limited that when the closed end of said shell is facing said ram means the latter will push the shell out of said gripping means but when the open end of said shell is facing said ram means the latter will not displace the shell, and means for rotating said gripping means to reverse the position of said shell with respect to said ram means in case it has not been pushed out of said gripping means.

3. Apparatus for transferring cylindrical shells having one end closed, comprising a transfer mechanism including gripping means for engaging a shell at its sides, a reciprocable ram means, means for transferring said gripping means to a postion adjacent said ram means to carry the shell into axial alignment with said ram means, said ram means being arranged to move toward the said shell and having a stroke so limited that when the closed end of said shell is facing said ram means the latter will push the shell out of said gripping means but when the open end of said shell is facing said ram means the latter will not displace the shell, and means for rotating said gripping means to reverse the position of said shell with respect to said ram means in case it has not been pushed out of said gripping means, said ram means being arranged to again move toward said shell to push it from said gripping means.

4. Apparatus for transferring cylindrical shells having one end closed, comprising a transfer mechanism including gripping means for engaging a shell at its sides, a reciprocable ram means, means for transferring said gripping means to a position adjacent said ram means to carry the shell into axial alignment with said ram means, said ram means being arranged to move toward the said shell and having a stroke so limited that when the closed end of said shell is facing said ram means the latter will push the shell out of said gripping means but when the open end of said shell is facing said ram means the latter will not displace the shell, and means for rotating said gripping means to reverse the position of said shell with respect to said ram means in case it has not been pushed out of said gripping means, said gripping means being arranged to open and thereby release said shell in the event it has not been pushed therefrom by said ram means.

5. Apparatus for transferring cylindrical shells having one end closed, comprising a transfer mechanism including substantially horizontally disposed jaws for engaging a shell at its sides, a substantially vertically disposed ram located at a delivery position, means for transferring said jaws to a position adjacent said ram to carry the shell below and in vertical axial alignment with said ram, said ram being arranged to move downward toward said shell and having a stroke so limited that when the closed end of said shell is uppermost the said ram will push the shell out of said jaws but when the open end of said shell is uppermost the said ram will not displace the shell, and means for rotating said jaws about their horizontal axis to invert the shell in case it was originally located therein with its closed end lowermost, said ram means being arranged to again move downward toward the shell to push it out of said jaws in case it was not removed by the said first downward movement of said ram.

6. Apparatus for transferring cylindrical shells having one end closed, comprising a transfer mechanism including substantially horizontally disposed jaws for engaging a shell at its sides, a substantially vertically disposed ram located at a delivery position, means for transferring said jaws to a position adjacent said ram to carry the shell below and in vertical axial alignment with said ram, said ram being arranged to move downward toward said shell and having a stroke so limited that when the closed end of said shell is uppermost the said ram will push the shell out of said jaws but when the open end of said shell is uppermost the said ram will not displace the shell, and means for rotating said jaws about their horizontal axis to invert the shell in case it was originally located therein with its closed end lowermost, said jaws being arranged to open and thereby release said shell in the event it has not been pushed therefrom by said ram.

OSKAR OGRODOWY.